United States Patent
Wu et al.

(10) Patent No.: US 8,121,584 B2
(45) Date of Patent: Feb. 21, 2012

(54) METHODS FOR HANDLING CONFERENCE COMMUNICATION AND THE COMMUNICATION APPARATUSES UTILIZING THE SAME

(75) Inventors: Chun-Ying Wu, Taipei County (TW); Yu-Syuan Jheng, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 551 days.

(21) Appl. No.: 12/276,840

(22) Filed: Nov. 24, 2008

(65) Prior Publication Data

US 2009/0291675 A1 Nov. 26, 2009

Related U.S. Application Data

(60) Provisional application No. 61/054,851, filed on May 21, 2008.

(51) Int. Cl.
*H04M 3/42* (2006.01)
*H04W 72/00* (2009.01)

(52) U.S. Cl. ......................... 455/416; 455/453
(58) Field of Classification Search .................. 455/416, 455/453
See application file for complete search history.

(56) References Cited

U.S. PATENT DOCUMENTS

| | | | |
|---|---|---|---|
| 6,782,413 B1 * | 8/2004 | Loveland | 709/204 |
| 6,957,251 B2 | 10/2005 | Wisner et al. | |
| 7,274,675 B2 * | 9/2007 | Iveland et al. | 370/260 |
| 7,577,090 B2 | 8/2009 | Xu et al. | |
| 7,907,533 B2 | 3/2011 | Davidson et al. | |
| 2004/0203977 A1 * | 10/2004 | Kennedy | 455/518 |

OTHER PUBLICATIONS

"3GPP TS 24.080" V3.7.1 (Sep. 2003) 3rd Generation Partnership Project: Technical Specification Group Core Network; Mobile radio interface layer 3 supplementary services specification; Formats and coding (Release 1999).

* cited by examiner

*Primary Examiner* — Nick Corsaro
*Assistant Examiner* — Joel Ajayi
(74) *Attorney, Agent, or Firm* — Thomas|Kayden

(57) ABSTRACT

A communication apparatus is provided. A first subscriber identity card camps on a first cell belonging to a first wireless network capable of providing a conference communication service for the first subscriber identity card with at most N peer communication entities via a first radio transceiver module. A second subscriber identity card camps on a second cell belonging to a second wireless network via a second radio transceiver module. A processor builds a conference communication for the first subscriber identity card with at most (N−1) peer communication entities via the first cell, receives an add request to add a new peer communication entity to the conference communication, adds the second subscriber identity card to the conference communication via the first cell, and adds the new peer communication entity to the conference communication via the second cell.

22 Claims, 12 Drawing Sheets

METHODS FOR HANDLING CONFERENCE COMMUNICATION AND THE COMMUNICATION APPARATUSES UTILIZING THE SAME

CROSS REFERENCE TO RELATED APPLICATIONS

This application claims the benefit of U.S. Provisional Application No. 61/054,851 filed May 21, 2008 and entitled "Systems and Methods for Handling Conference Calls and Incoming Calls With Two or More (U)SIM Cards", the entire contents of which are hereby incorporated by reference.

BACKGROUND OF THE INVENTION

1. Field of the Invention

The invention relates to a method for handling conference communication service in a communication apparatus, and more particularly to a method for handling conference communication service in the communication apparatus communicating with increased number of peer communication entities exceeding the limitation of the network.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) communication system is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM communication system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is possible to provide multiple wireless communication services using different or the same communication technologies in one communication apparatus. In order to increase the possible number of peer communication entities joining in, in a conference communication service for a specific user limited by the network, methods for handling conference communication service in the communication apparatus communicating with increased number of peer communication entities exceeding the limitation of the network are provided.

BRIEF SUMMARY OF THE INVENTION

Communication apparatuses and methods for handling conference communication service in the communication apparatus communicating with increased number of peer communication entities exceeding the limitation of the network are provided. An embodiment of a communication apparatus comprises a first subscriber identity card, a second subscriber identity card, a first radio transceiver module, a second radio transceiver module, and a processor coupled to the first subscriber identity card, the second subscriber identity card, the first radio transceiver module and the second radio transceiver module for controlling the operations thereof. A communication apparatus is provided. A first subscriber identity card camps on a first cell belonging to a first wireless network capable of providing a conference communication service for the first subscriber identity card with at most N peer communication entities via a first radio transceiver module. A second subscriber identity card camps on a second cell belonging to a second wireless network via a second radio transceiver module. A processor builds a conference communication for the first subscriber identity card with at most (N−1) peer communication entities via the first cell, receives an add request to add a new peer communication entity to the conference communication, adds the second subscriber identity card to the conference communication via the first cell, and adds the new peer communication entity to the conference communication via the second cell.

Another embodiment of a method for handling conference communication service in the communication apparatus is provided. The communication apparatus comprises a first radio transceiver module, a second radio transceiver module, a first subscriber identity card camping on a first cell belonging to a first wireless network via the first radio transceiver module, a second subscriber identity card camping on a second cell belonging to a second wireless network via the second radio transceiver module. The first wireless network is capable of providing a conference communication service for the first subscriber identity card with at most N peer communication entities. The method comprises: building a conference communication for the first subscriber identity card with at most (N−1) peer communication entities via the first cell; receiving an add request to add a new peer communication entity to the conference communication; adding the second subscriber identity card to the conference communication via the first cell; and adding the new peer communication entity to the conference communication via the second cell.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
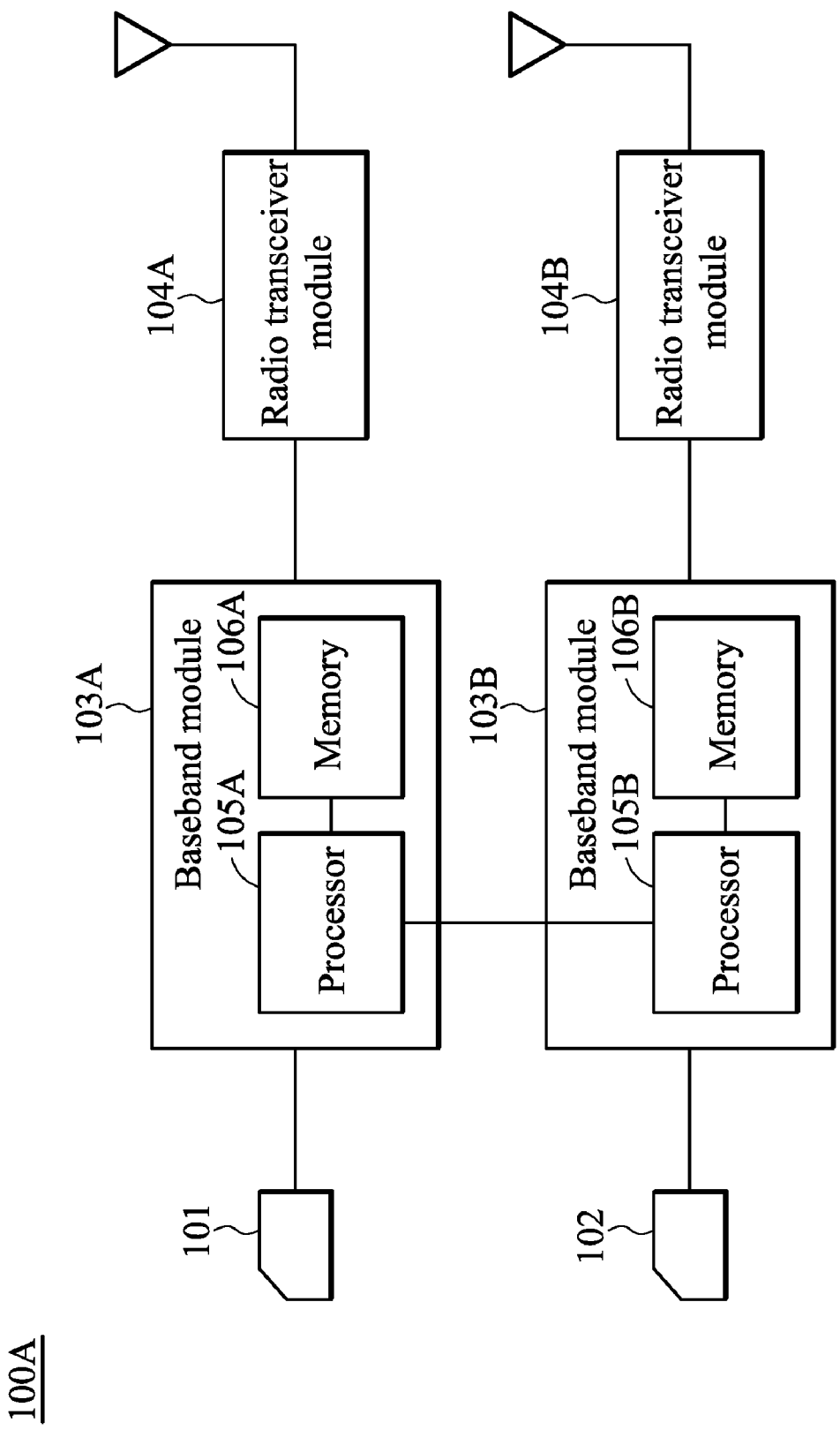
FIG. 1 shows a communication apparatus according to an embodiment of the invention.

FIG. 1 shows a communication apparatus capable of handling conference communication service for a specific user communicating with increased number of peer communication entities exceeding the limitation of the network according to an embodiment of the invention. As shown in FIG. 1, communication apparatus 100A comprises subscriber identity cards 101 and 102 plugged into two sockets, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The radio transceiver modules 104A and 104B receive wireless radio frequency signals, and convert the received signals to baseband signals to be processed by the baseband modules 103A and 103B, respectively, or receive baseband signals respectively from the baseband modules 103A and 103B and convert the received signals to wireless radio frequency signals to be transmitted to a peer device. The radio transceiver modules 104A or 104B may comprise a plurality of hardware devices to perform radio frequency conversion. For example, the radio transceiver modules 104A or 104B may comprise a mixer to multiply the baseband signals with a carrier oscillated in the radio frequency of the wireless communication system, wherein the radio frequency may be, for example, 900 MHz or 1800 MHz for a global system for mobile communication (GSM) communication system, or 1900 MHz or 2100 MHz for a Universal Mobile Telecommunications System (UMTS) communication system. The baseband modules 103A and 103B further respectively convert the baseband signals to a plurality of digital signals, and processes the digital signals, and vice versa. The baseband modules 103A or 103B may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processors may be a master processor and the other one may be a slave processor to cooperate with the master processor. The processors 105A and 105B respectively read data from the plugged subscriber identity cards 101 and 102 and writes data to the plugged subscriber identity cards 101 and 102. It is to be noted that the memory devices 106A and 106B may also be configured outside of the baseband modules 103A and 103B and the invention should not be limited thereto.

Figure 2:
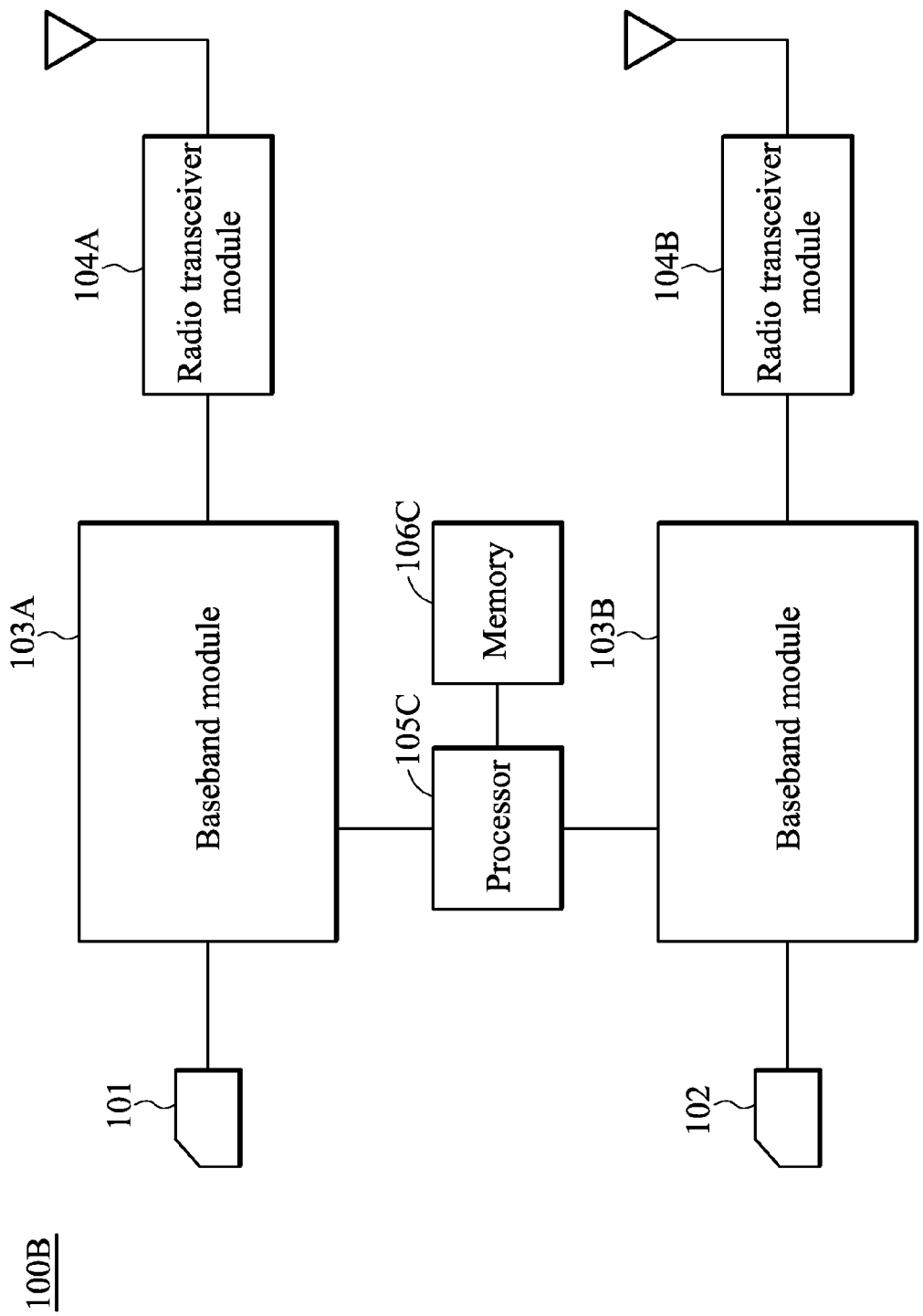
FIG. 2 shows a communication apparatus according to another embodiment of the invention.

FIG. 2 shows a communication apparatus according to another embodiment of the invention. As shown in FIG. 2, the communication apparatus 100B may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processors 105A or 105B and are not described here for brevity. The described processors 105A, 105B and 105C may be general-purposed processors and execute program code performing the mentioned control operations. The described memory devices 106A, 106B and 106C may comprise at least one of read only memory (ROM), random access memory (RAM), NOR flash and NAND flash for storing program code and data.

Figure 3:
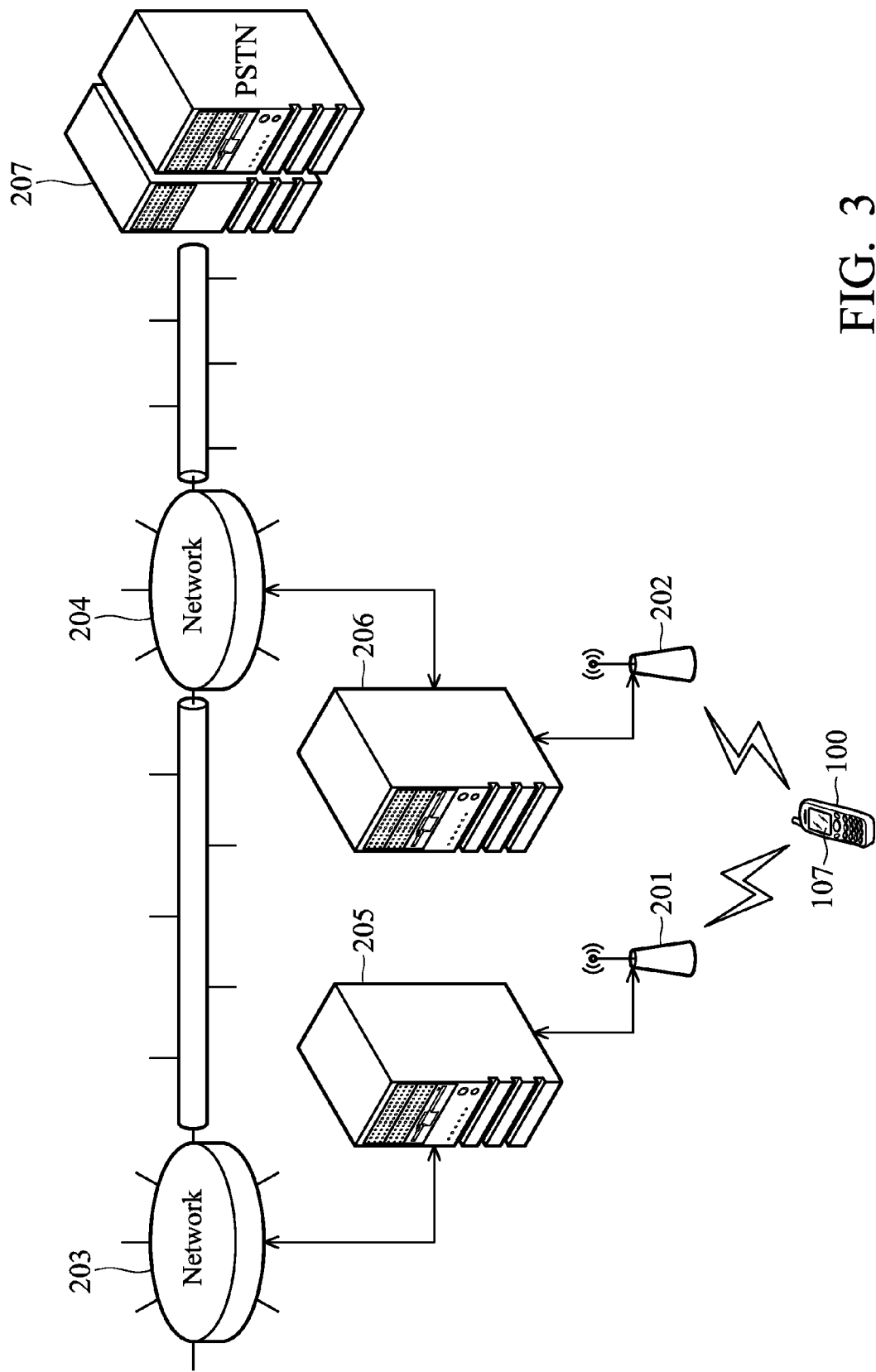
FIG. 3 shows an exemplary network topology according to an embodiment of the invention.

FIG. 3 shows an exemplary network topology according to an embodiment of the invention. The communication apparatus 100 shown in FIG. 3, may be the communication apparatuses 100A, and 100B previously described in FIG. 1 and FIG. 2. Thus, from hereinafter, the communication apparatus 100 will be used to represent all like previously described apparatus for brevity. The communication apparatus 100, equipped with more than one subscriber identity card, may simultaneously access more than one network 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, or an access point compatible with 802.11a, 802.11b, 802.11g or 802.16. The communication apparatus 100 may issue an apparatus originated wireless communication request, also referred to as a mobile originated (MO) call request, such as a voice call, a data call, a video call, or a voice over Internet Protocol (VOIP) call, to a called party (i.e. the corresponding peer communication entity of another wired or wireless communication apparatus) through at least one of the networks 203 and 204 with corresponding network controlling center 205 and 206 (for example, the GSM network with a Base Station Controller (BSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communication apparatus 100 may receive an apparatus terminated wireless communication request, also referred to as a mobile terminated (MT) call request, such as an incoming phone call, with any of the subscriber identity cards from a calling party (i.e. the corresponding peer communication entity of another wired or wireless communication apparatus). It is to be understood that there may be one or more gateways positioned between heterogeneous types of networks.

According to an embodiment of the invention, the subscriber identity cards 101 and 102 may relate to one type of wireless communication system. For example, the subscriber identity card 101 or 102 may be the subscriber identity module (SIM) card corresponding to the global system for mobile communication (GSM) communication system, or the universal subscriber identity module (USIM) card corresponding to the universal mobile telecommunications system (UMTS, also called 3G) or time division-synchronous code division multiple access (TD-SCDMA) communication system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as 105A, 105B or 105C, of the baseband module, such as 103A or 103B, may interact with a micro control unit (MCU) of the SIM card to fetch data or SAT commands from the plugged SIM card. The communication apparatus 100 is immediately programmed after being plugged into the SIM card. The SIM card may also be programmed to display custom menus for personalized services. The communication apparatus 100 may be plugged into an USIM card for UMTS (also-called 3G) telephony communication. The USIM card stores user account information, IMSI, authentication information and a set of USIM Application Toolkit (USAT) commands and provides storage space for text messages and phone book contacts. The baseband processors 105A, 105B or 105C may interact with an MCU of the USIM card to fetch data or SAT commands from the plugged USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number that may be within a range, by using a window mechanism to avoid replay attacks, and generate the session keys CK and IK to be used in the confidentiality and integrity algorithms of the KASUMI (also termed A5/3) block cipher in the UMTS. The communication apparatus 100 is immediately programmed after being plugged into the USIM card. The IMSI is a unique number associated with a GSM, a UMTS or a (TD-SCDMA) network user. The IMSI may be sent by the communication apparatus 100 to the GSM, UMTS or TD-SCDMA network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM, UMTS or TD-SCDMA network user.

According to an embodiment of the invention, the methods for handling conference communication service in the communication apparatus, such as 100A, 100B or 100 previously described, for a specific user communicating with increased number of peer communication entities exceeding the limitation of the network are described in the following. The subscriber identity card 101 is with an address, hereinafter called $CN_A$ for brevity, and camps on a cell, hereinafter called $Cell_A$ for brevity, belonging to a wireless network, hereinafter called $NW_A$ for brevity, via the radio transceiver modules 104A. The address may be, as an example, a series of numbers directed to a specific subscriber identity card, such as an IP address for a VOIP call or a phone number for a circuit switch call, or others. Similarly, the subscriber identity card 102 is with an address, hereinafter called $CN_B$ for brevity, and camps on a cell, hereinafter called $Cell_B$ for brevity, belonging to a wireless network, hereinafter called $NW_B$ for brevity, via the radio transceiver modules 104B. In the perspective of networks, the subscriber identity cards 101 and 102 represent independent communication entities. It is to be noted that $Cell_A$ and $Cell_B$ may be the same or different cells belonging to the same or different wireless networks of the same or different communication technologies, and the invention should not be limited thereto.

According to the embodiment of the invention, the wireless network, such as $NW_A$ or $NW_B$, is capable of providing several supplementary services. To perform the supplementary services, one subscriber identity card of the communication apparatus 100 may first initiate a HOLD message. A network controlling center of the wireless network, such as the mobile switching center (MSC), receives the HOLD message, interrupts the connection and indicates with a HOLD message to a peer communication entity that is communicating with the subscriber identity card of the communication apparatus 100. The communication between the subscriber identity card of the communication apparatus 100 and the peer communication entity may be disposed in a hold state. The HOLD message may be acknowledged with a HOLD ACKNOWLEDGE message, which leads to both the requesting subscriber identity card and the network controlling center, such as the MSC, to interrupt communication on an existing active call and then subsequently, if required, re-establish communication. It is to be understood that the traffic channel remains assigned to the $CN_A$ after the communication is interrupted. The subscriber identity card which initiates the hold process may next establish another wireless communication. One of the supplementary services provided by the wireless network, such as $NW_A$ or $NW_B$, may be a conference communication service, such as a conference call or so-called a multi party call. This supplementary service uses the FACILITY message of the common information element procedure: Build Multi Party Call (BuildMPTY). BuildMPTY is invoked by the subscriber identity card to request the network controlling center, such as the MSC, to combine several wireless communications into a conference communication so that all the communication entities may hear and speak to each other participating in the conference communication. Upon establishing a conference communication, another hold-related supplementary service may be involved by using the FACILITY message of the common information element procedure: Hold Multi Party Call (HoldMPTY). HoldMPTY may be invoked by one subscriber identity card to put the connection to multi peer communication entities currently participating in the conference communication on hold. Similarly, the network controlling center, such as the MSC, interrupts the connections and indicates with HOLD messages to the peer communication entities, indicating that the calls are in the hold state. The FACILITY(HoldMPTY) is acknowledged with a FACILITY ACKNOWLEDGE message, which leads to both the requesting subscriber identity card and the network controlling center, such as the MSC, to interrupt communication on an existing active call and then subsequently, if required, re-establish communication. It is to be understood that the traffic channel remains assigned to the $CN_A$ after the communication is interrupted. The subscriber identity card which initiates the hold multi party call process may next establish another wireless communication.

Figure 4A:
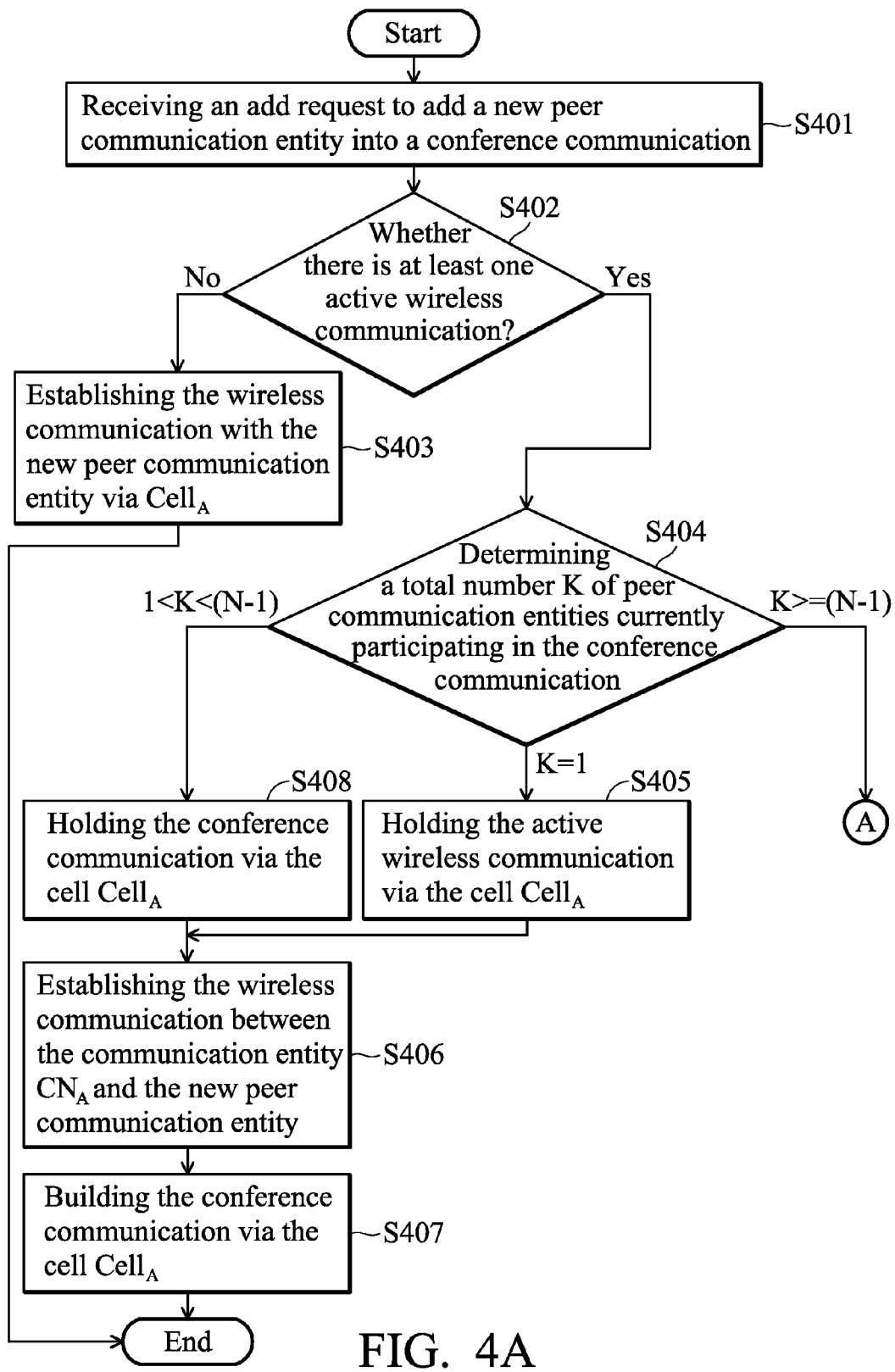
FIG. 4A and FIG. 4B show a flow chart of the method for handling conference communication service in the communication apparatus communicating with increased number of peer communication entities exceeding the limitation of the network according to an embodiment of the invention.
Figure 4B:
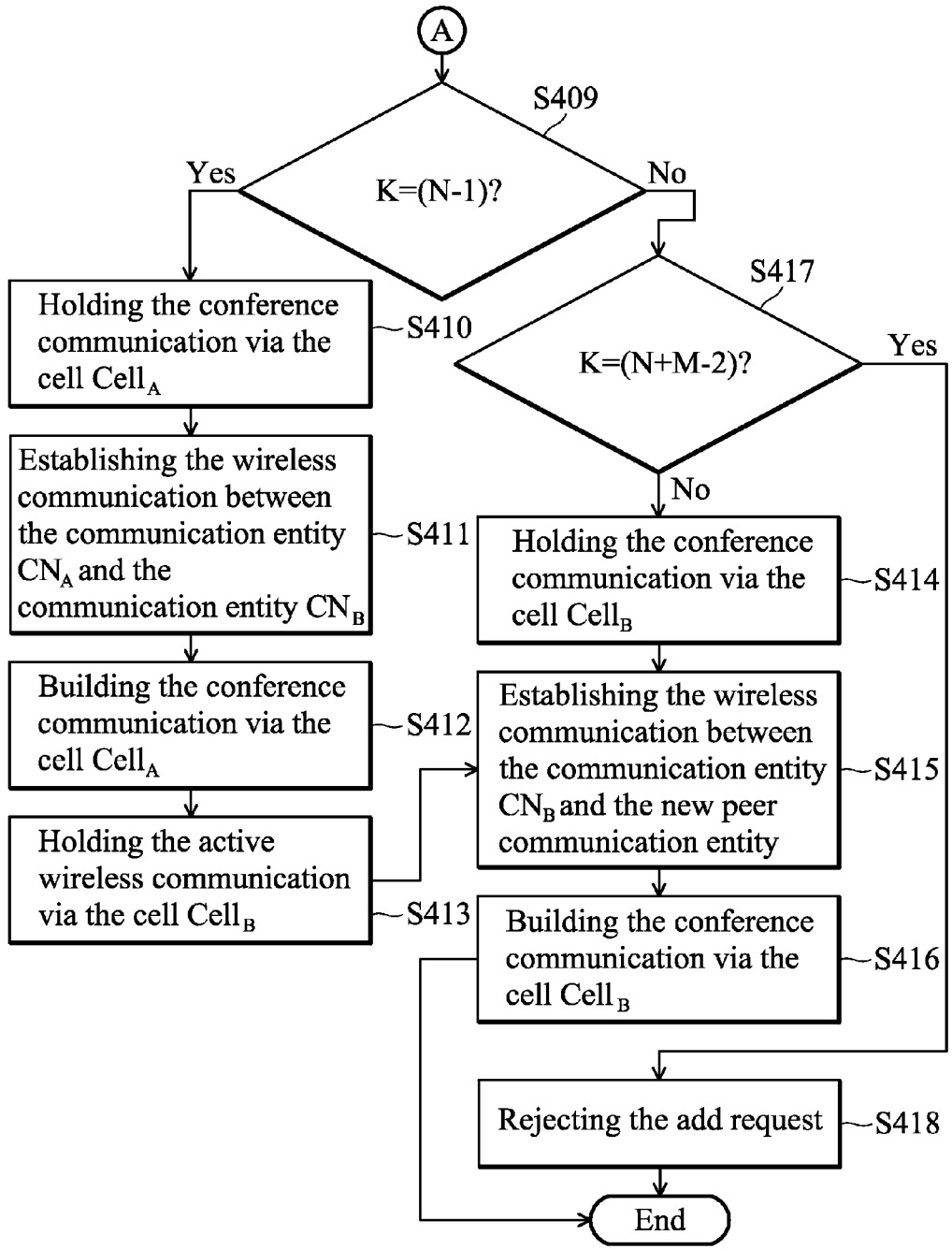

FIG. 4A and FIG. 4B show a flow chart illustrating the method for handling conference communication service in the communication apparatus, such as 100, 100A or 100B, communicating with increased number of peer communication entities exceeding the limitation of the network according to an embodiment of the invention. According to the embodiment of the invention, the wireless network, such as $NW_A$ or $NW_B$, is capable of providing the conference communication service for a specific requesting subscriber identity card with a maximum number of peer communication entities joining therein. Assume that the maximum of peer communication entities joining in the conference communication service provided by the wireless network $NW_A$ corresponding to the subscriber identity card 101 is limited to N, and the maximum of peer communication entities joining in the conference communication service provided by the wireless network $NW_B$ corresponding to the subscriber identity card 102 is limited to M, where M and N are integers. It is to be understood that M may be the same as or different from N. Steps of the process for handling the conference communication as shown in FIG. 4A and FIG. 4B may be substantially classified into five groups in response to the total number of peer communication entities currently participating in the conference communication falling into ranges of: 0; 1 to (N−2); (N−1); N to (N+M−2); and greater than (N+M−2) respectively.

As shown in FIG. 4A and FIG. 4B, when the processor, such as 105A, 105B or 105C, executing program code, the process begins to receive an add request to add a new peer communication entity into a conference communication (Step S401). The add request may be generated by a user holding the communication apparatus 100, 100A or 100B via a man-machine interface (MMI). The MMI may comprise screen menus and icons, command language and online help displayed on the display device 107 as shown in FIG. 3, with at least one input device of a touch panel, physical keys on a key pad, buttons, dragging jogs and the similar. The processor next determines whether at least one active wireless communication is currently being maintained (Step S402). For example, the processor determines whether there is at least one active call. When there is no active wireless communication, the processor establishes the wireless communication with the new peer communication entity by transmitting a wireless communication request, may be referred to as mobile originated (MO) call request, via a corresponding radio transceiver module to a corresponding cell that one subscriber identity card camps on (Step S403). As an example, the processor transmits a wireless communication request from the subscriber identity card 101 ($CN_A$) via the corresponding radio transceiver module 104A to $Cell_A$ of $NW_A$, and establishes the wireless communication between $CN_A$ and the new peer communication entity via $Cell_A$. Alternatively, when there is at least one active wireless communication, the processor further determines a total number K of peer communication entities currently participating in the conference communication (Step S404). After the total number of peer communication entities has been determined, relevant operations are performed accordingly. When K=1, which means there is one active peer communication entity $CN_1$ that is communicating with $CN_A$, the processor transmits a hold request, such as the HOLD message previously described, from $CN_A$ to $Cell_A$ to request to hold the active connection between $CN_A$ and $CN_1$ (Step S405). The processor next transmits a wireless communication request, such as an apparatus originated wireless communication request previously described, from $CN_A$ to $Cell_A$ to request to establish a wireless communication with the new peer communication entity, and establishes the wireless communication between $CN_A$ and the new peer communication entity by performing the corresponding signaling procedures and establishing the traffic channel (Step S406). Next, the processor builds the conference communication by transmitting a build conference communication request, such as a Build Multi Party Call (BuildMPTY) message previously described, from $CN_A$ to $Cell_A$ to connect the new peer communication entity with the held peer communication entity to form a new conference communication (Step S407). After that, the user holding the communication apparatus 100, 100A or 100B may chat with all participators joining the conference communication.

When 1<K<(N−1), the processor transmits a hold request, such as the hold conference communication request: HoldMPTY message previously described, from $CN_A$ to $Cell_A$ to request to hold the conference communication with the peer communication entities $CN_1$~$CN_K$ currently participating in the conference communication (Step S408). The processor next transmits a wireless communication request, such as an apparatus originated wireless communication request previously described, from $CN_A$ to $Cell_A$ to request to establish a wireless communication with the new peer communication entity, and establishes the wireless communication between $CN_A$ and the new peer communication entity (Step S406). Next, the processor builds the conference communication by transmitting a build conference communication request, such as a Build Multi Party Call (BuildMPTY) message previously described, from $CN_A$ to $Cell_A$ to connect the new peer communication entity with the held peer communication entities to form a new conference communication (Step S407). After that, the user holding the communication apparatus 100, 100A or 100B may continue to chat with all participators joining the conference communication.

When K>=(N−1), the processor further determines whether the total number K equals to (N−1) (Step S409), where N is the maximum of peer communication entities joining in the conference communication provided by the wireless network $NW_A$. When K=(N−1), the processor establishes wireless communication between $CN_A$ and $CN_B$ as a new peer communication entity via the $Cell_A$, and add $CN_B$ to the conference communication so as to increase the maximum of peer communication entities participating in the conference communication to (N+M−2), where M is the maximum of peer communication entities joining in the conference communication provided by the wireless network $NW_B$ corresponding to $CN_B$. As shown in FIG. 4B, the processor transmits a hold conference communication request, such as the HoldMPTY message previously described, from $CN_A$ to the cell $Cell_A$ to request to hold the conference communication with the peer communication entities $CN_1 \sim CN_K$ currently participating therein (Step S410). The processor next transmits a first wireless communication request, such as an apparatus originated wireless communication request previously described, from $CN_A$ to $Cell_A$ to request to establish a wireless communication with $CN_B$ by performing the corresponding signaling procedures and establishing the traffic channel, and establishes the wireless communication between the communication entities $CN_A$ and $CN_B$ (Step S411). The processor next builds the conference communication by transmitting a build conference communication request, such as a Build Multi Party Call (BuildMPTY) message previously described, from $CN_A$ to $Cell_A$ to connect $CN_B$ with the held peer communication entities to form a new conference communication (Step S412). Next, the processor transmits a hold request from $CN_B$ to $Cell_B$ to request to hold the active wireless communication with $CN_A$ (Step S413). Next, the processor transmits a second wireless communication request, such as an apparatus originated wireless communication request previously described, from $CN_B$ to $Cell_B$ to request to establish a wireless communication with the new peer communication entity, and establishes the wireless communication between $CN_B$ and the new peer communication entity by performing the corresponding signaling procedures and establishing the traffic channel (Step S415). Finally, the processor builds the conference communication by transmitting a build conference communication request, such as a Build Multi Party Call (BuildMPTY) message previously described, from $CN_B$ to $Cell_B$ to connect the new peer communication entity with the held peer communication entities to form a new conference communication (Step S416). After that, the user holding the communication apparatus 100, 100A or 100B may continue to chat with all participants holding the peer communication entities $CN_1 \sim CN_K$, where K equals (N−1) at this moment.

When K does not equal (N−1), the processor further determines whether K=(N+M−2). Meanwhile, (N−1)<K<(N+M−2) occurs when K does not equal to (N+M−2). The processor next transmits a hold request from $CN_B$ to $Cell_B$ to request to hold the conference communication with the peer communication entities $CN_A$ and $CN_1 \sim CN_K$ (Step S414). Next, the processor transmits a wireless communication request, such as an apparatus originated wireless communication request previously described, from $CN_B$ to $Cell_B$ to request to establish a wireless communication with the new peer communication entity, and establishes the wireless communication between the communication entity $CN_B$ and the new peer communication entity by performing the corresponding signaling procedures and establishing the traffic channel (Step S415). Finally, the processor builds the conference communication by transmitting a build conference communication request, such as the Build Multi Party Call (BuildMPTY) message previously described, from $CN_B$ to $Cell_B$ to connect the new peer communication entity with the held peer communication entities to form a new conference communication (Step S416). After that, the user holding the communication apparatus 100, 100A or 100B may continue to chat with all participators joining the conference communication.

When K equals to (N+M−2), the processor further rejects the add request and shows an indication of the rejection via the MMI on the display device 107 (Step S418) and the user holding the communication apparatus 100, 100A or 100B may continue to chat with all participators holding the peer communication entities $CN_1 \sim CN_K$, where K equals (N+M−2) at this moment. For the total number of peer communication entities exceeding N, which desired to be added in a conference, may be known in the beginning, those skilled in the art may devise the process to perform steps S410 to S413, S415 and S416 after determining K=2, 3, or, (N−2), instead of (N−1). Moreover, in some embodiments, the process may be devised to perform steps for establishing communication connection between $CN_A$ and $CN_B$ and adding the established one in a conference communication before connecting to any peer communication entity.

Figure 5:
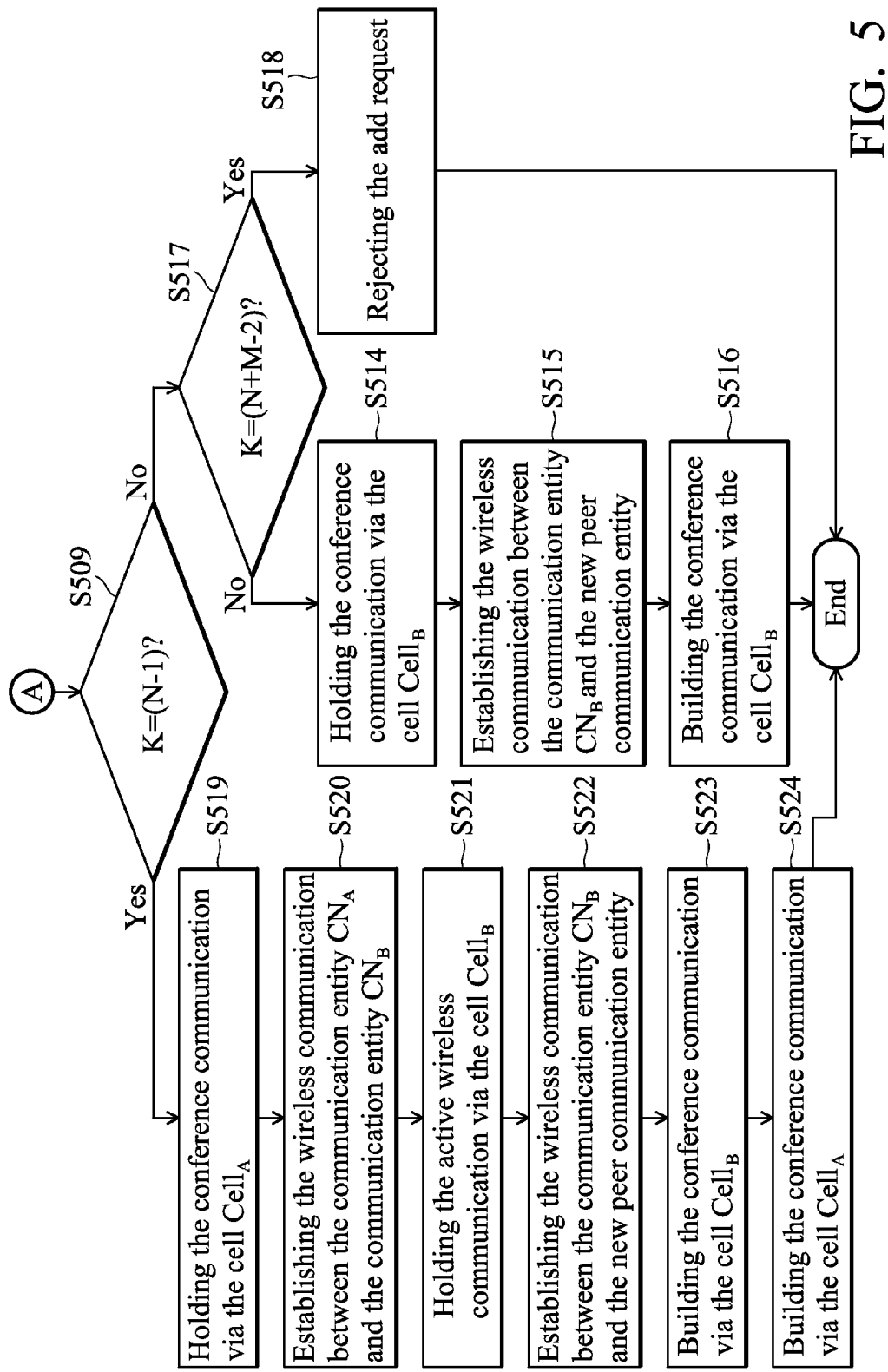
FIG. 5 shows a flow chart of the method for handling conference communication service in the communication apparatus when the total number K=(N−1) according to another embodiment of the invention.

FIG. 5 shows a flow chart illustrating the method for handling conference communication service in the communication apparatus when the total number K=(N−1) according to another embodiment of the invention. As shown in FIG. 5, after determining the total number K=(N−1) in Step S509, the processor further transmits a hold request from $CN_A$ to $Cell_A$ to request to hold the conference communication with the peer communication entities (Step S519). Next, the processor transmits a first wireless communication request, such as the apparatus originated wireless communication request previously described, from $CN_B$ to $Cell_B$ to request to establish a first wireless communication with the $CN_A$, and establishes the first wireless communication between the $CN_A$ and $CN_B$ by performing the corresponding signaling procedures and establishing the traffic channel (Step S520). Next, the processor transmits a hold request from $CN_B$ to $Cell_B$ to request to hold the active wireless communication with $CN_A$ (Step S521). Next, the processor transmits a second wireless communication request, such as the apparatus originated wireless communication request previously described, from $CN_B$ to $Cell_B$ to request to establish a second wireless communication with the new peer communication entity, and establishes the second wireless communication between $CN_B$ and the new peer communication entity by performing the corresponding signaling procedures and establishing the traffic channel (Step S522). Next, the processor transmits a first build conference communication request from $CN_B$ to $Cell_B$ to connect the new peer communication entity with the held $CN_A$ to form a new conference communication (Step S523), and transmits a second build conference communication request from $CN_A$ to $Cell_A$ to connect the $CN_B$ with the held peer communication entities to form another new conference communication (Step S524). The remaining steps S514~S518 shown in FIG. 5 are respectively the same as the steps S414~S418 shown in FIG. 4B, and the descriptions thereof are omitted here for brevity. For the total number of peer communication entities exceeding N, which desired to be added in a conference, may be known in the beginning, those skilled in the art may devise the process to perform steps S519 to S524 after determining K=2, 3, or, (N−2), instead of (N−1).

Figure 6:
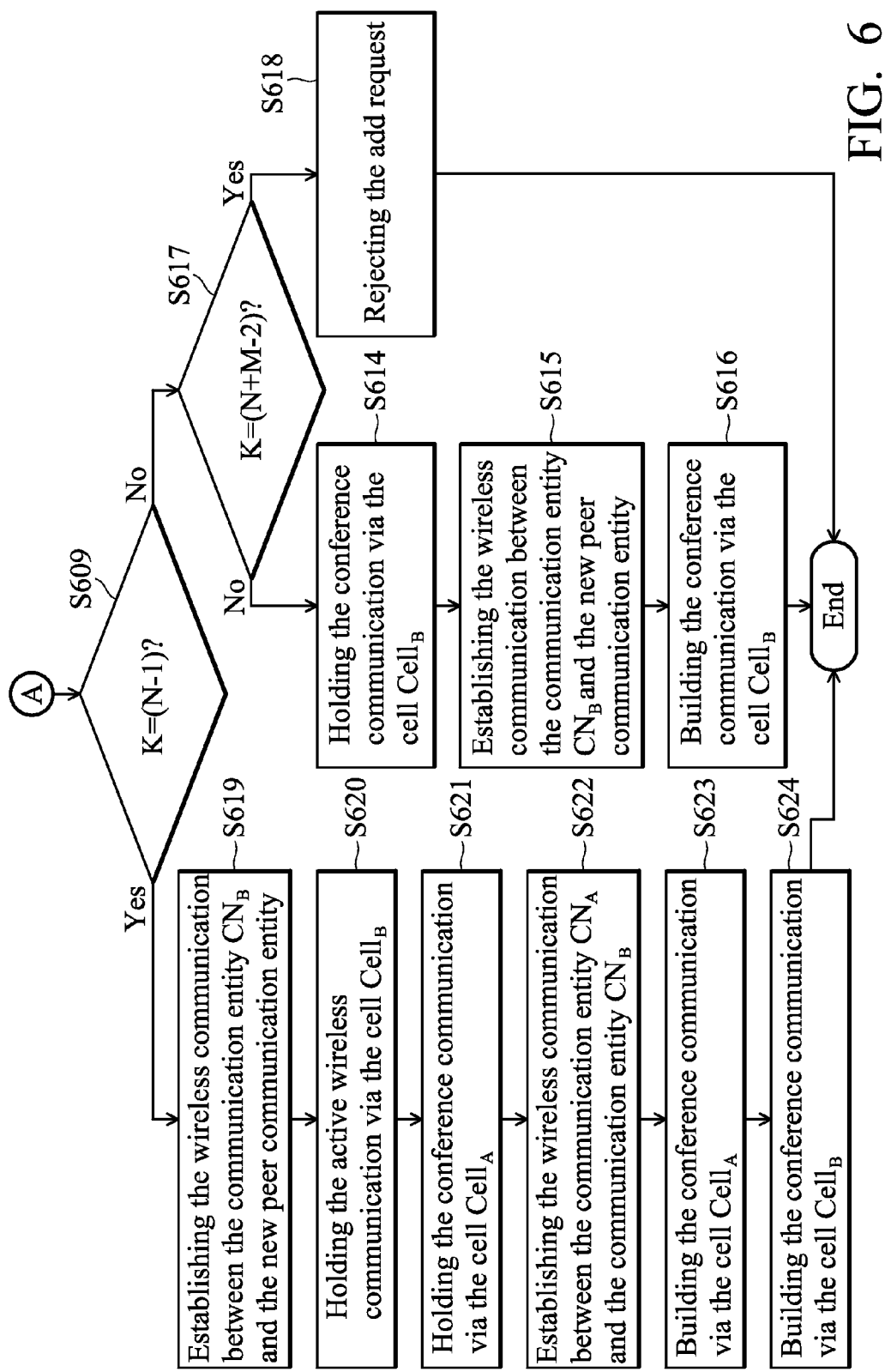
FIG. 6 shows a flow chart of the method for handling conference communication service in the communication apparatus when the total number K=(N−1) according to another embodiment of the invention.

FIG. 6 shows a flow chart illustrating the method for handling conference communication service in the communication apparatus when the total number K=(N−1) according to another embodiment of the invention. As shown in FIG. 6, after determining the total number K=(N−1) in Step S609, the processor further transmits a first wireless communication request, such as an apparatus originated wireless communication request previously described, from $CN_B$ to $Cell_B$ to request to establish a first wireless communication with the new peer communication entity, and establishes the first wireless communication between $CN_B$ and the new peer communication entity by performing the corresponding signaling procedures and establishing the traffic channel (Step S619). Next, the processor transmits a first hold request from $CN_B$ to $Cell_B$ to request to hold the active wireless communication with the new peer communication entity (Step S620). Next, the processor transmits a second hold request from $CN_A$ to $Cell_A$ to request to hold the conference communication with the peer communication entities (Step S621). It is to be noted that the step S621 may be performed before step S619 or before step S620 and the invention should not be limited thereto. Next, the processor transmits a second wireless communication request from $CN_A$ to $Cell_A$ to request to establish a second wireless communication with the communication entity $CN_B$, and establishes the second wireless communication between the communication entities $CN_A$ and $CN_B$ (Step S622). Next, the processor transmits a first build conference communication request from $CN_A$ to $Cell_A$ to connect $CN_B$ with the held peer communication entities to form a new conference communication via $Cell_A$ (Step S623), and transmits a second build conference communication request from $CN_B$ to $Cell_B$ to connect the new peer communication entity with the held $CN_A$ to form another new conference communication (Step S624). The remaining steps S614~S618 shown in FIG. 6 are respectively the same as the steps S414~S418 shown in FIG. 4B, and the descriptions thereof are omitted here for brevity. For the total number of peer communication entities exceeding N, which desired to be added in a conference, may be known in the beginning, those skilled in the art may devise the process to perform steps S619 to S624 after determining K=2, 3, or, (N−2), instead of (N−1).

Figure 7:
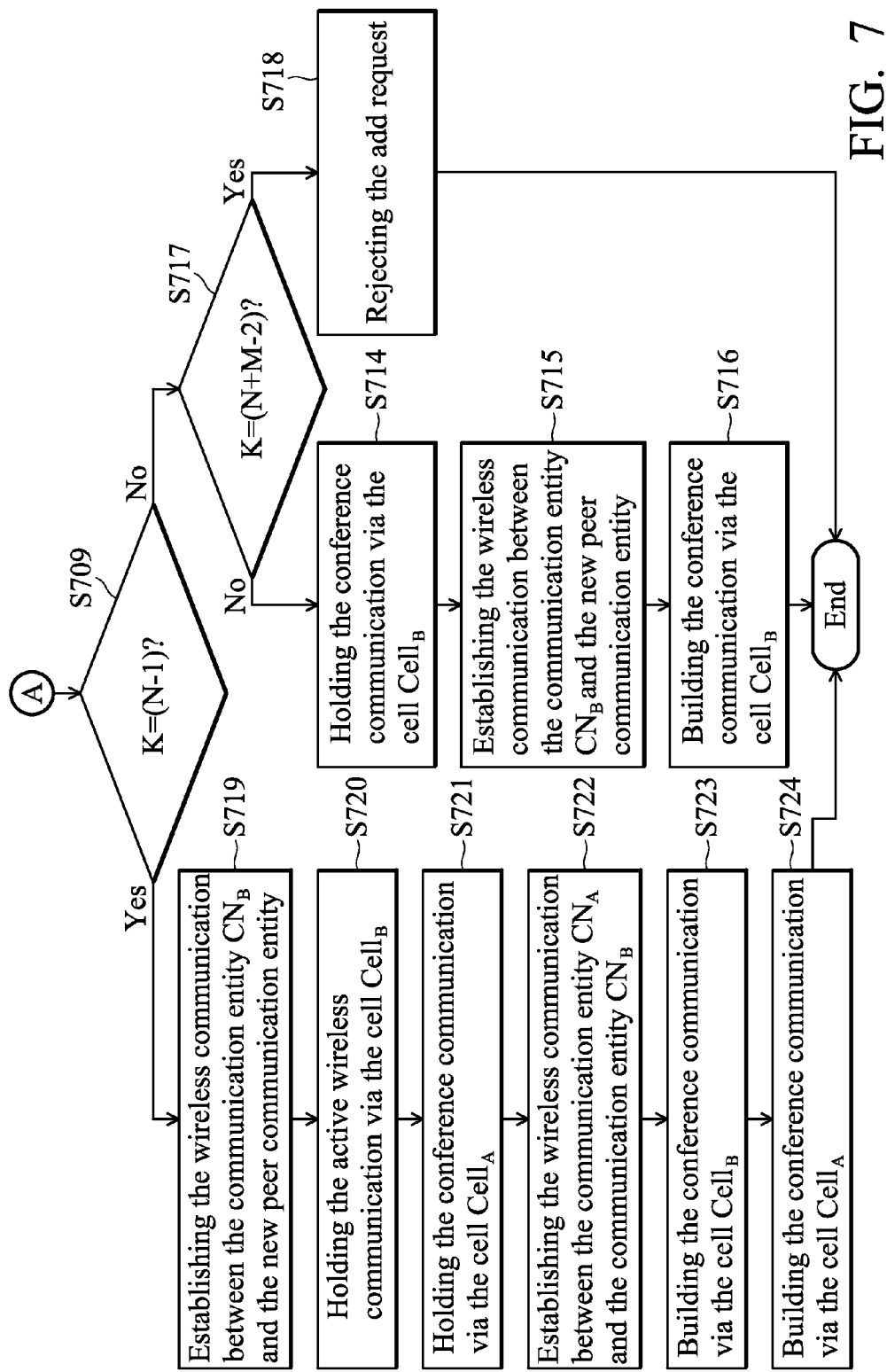
FIG. 7 shows a flow chart of the method for handling conference communication service in the communication apparatus when the total number K=(N−1) according to another embodiment of the invention.

FIG. 7 shows a flow chart illustrating the method for handling conference communication service in the communication apparatus when the total number K=(N−1) according to another embodiment of the invention. As shown in FIG. 7, after determining the total number K=(N−1) in Step S709, the processor further transmits a first wireless communication request, such as the apparatus originated wireless communication request previously described, from $CN_B$ to $Cell_B$ to request to establish a first wireless communication with the new peer communication entity, and establishes the first wireless communication between $CN_B$ and the new peer communication entity by performing the corresponding signaling procedures and establishing the traffic channel (Step S719). Next, the processor transmits a first hold request from $CN_B$ to $Cell_B$ to request to hold the active wireless communication with the new peer communication entity (Step S720). Next, the processor transmits a second hold request from $CN_A$ to $Cell_A$ to request to hold the conference communication with the peer communication entities (Step S721). It is to be noted that the step S721 may be performed before step S719 or before step S720 and the invention should not be limited thereto. Next, the processor transmits a second wireless communication request from $CN_B$ to $Cell_B$ to request to establish a second wireless communication with $CN_A$, and establishes the second wireless communication between $CN_A$ and $CN_B$ (Step S722). Next, the processor transmits a first build conference communication request from $CN_B$ to $Cell_B$ to connect the new peer communication entity with the held $CN_A$ to form a new conference communication (Step S723), and transmits a second build conference communication request from $CN_A$ to $Cell_A$ to connect $CN_B$ with the held peer communication entities to form another new conference communication (Step S724). The remaining steps S714~S718 shown in FIG. 7 are respectively the same as the steps S414~S418 shown in FIG. 4B, and the descriptions thereof are omitted here for brevity. For the total number of peer communication entities exceeding N, which desired to be added in a conference, may be known in the beginning, those skilled in the art may devise the process to perform steps S719 to S724 after determining K=2, 3, or, (N−2), instead of (N−1).

Figure 8:
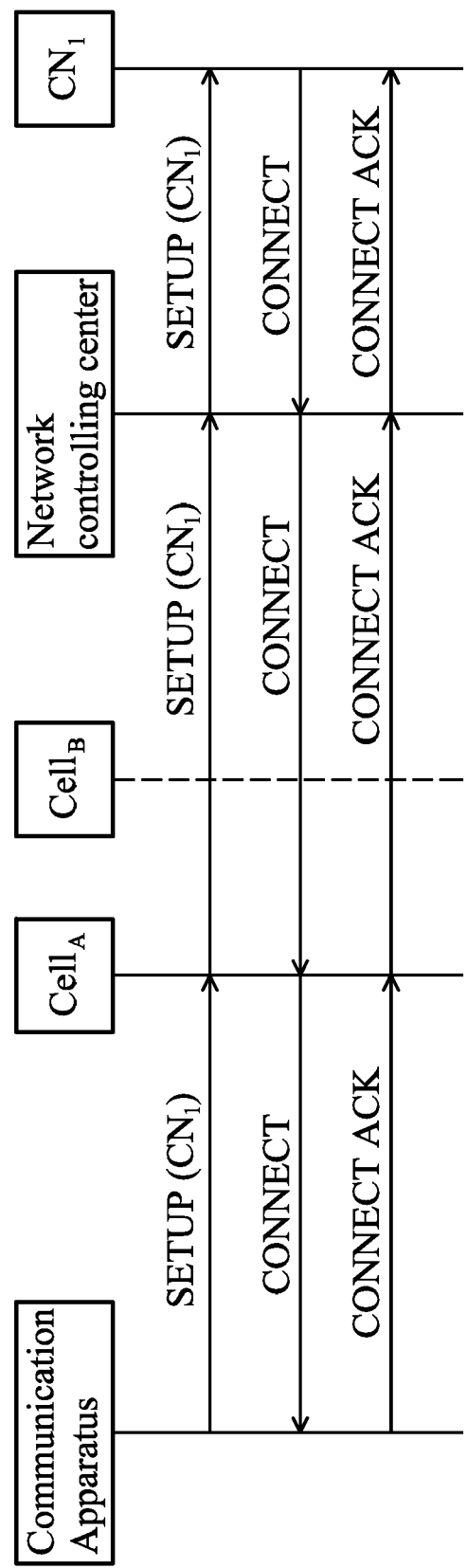
FIG. 8 shows a sequence diagram illustrating a simplified protocol message exchange according to an embodiment of the invention when the total number K=0.
Figure 9:
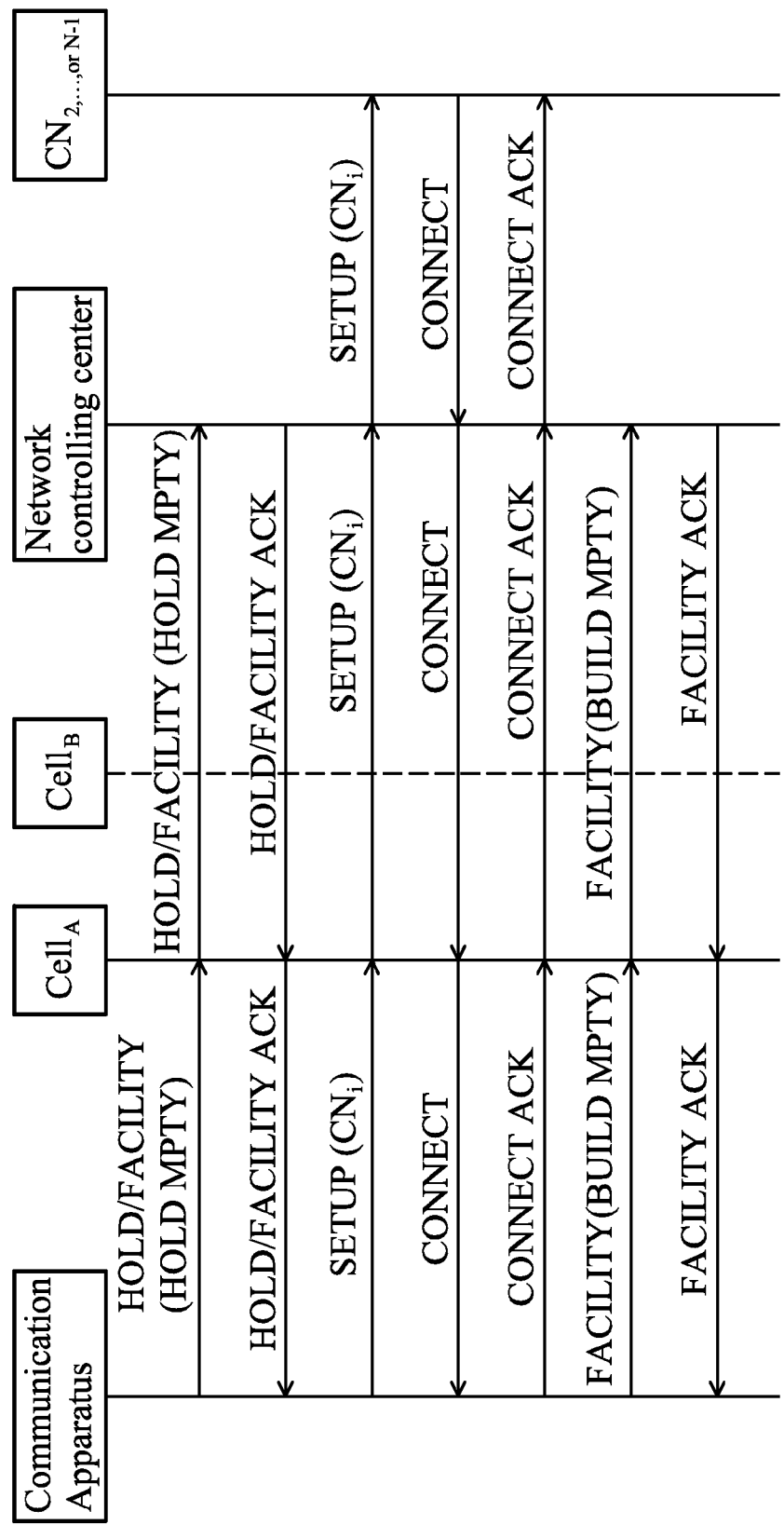
FIG. 9 shows a sequence diagram illustrating a simplified protocol message exchange for adding the $2^{th}$ to $(N-1)^{th}$ new peer communication entity into the conference communication according to an embodiment of the invention when the total number 1=<K<(N−1)

FIG. 8 shows a sequence diagram illustrating an exemplary protocol message exchange according to an embodiment of the invention when the total number K=0, i.e., there is no active wireless communication at that moment. To begin, the communication apparatus 100, 100A or 100B, hereinafter represented by the communication apparatus 100 for brevity, sends a SETUP message with a corresponding address (such as an IP address for a VOIP call or a phone number for a circuit switch call, or others) of a peer communication entity $CN_1$ through $Cell_A$ to establish an active wireless communication with $CN_1$. After $CN_1$ replies with a CONNECT message to the communication apparatus 100 and the communication apparatus 100 transmits a CONNECT ACK message to $CN_1$, the active wireless communication between $CN_1$ and the communication apparatus 100 is established. FIG. 9 shows a sequence diagram illustrating an exemplary protocol message exchange for adding the $2^{th}$ to $(N-1)^{th}$ peer communication entity into a conference communication according to an embodiment of the invention when the total number $1<=K<$ (N−1). To begin, the communication apparatus 100 sends a HOLD message to the network through $Cell_A$ to hold an active wireless communication, or sends a FACILITY(HoldMPTY) message to the network controlling center, such as MSC, to hold a conference communication. After the network controlling center replies with a HOLD/FACILITY ACK message, the active wireless communication, or active conference communication is held. Subsequently, the communication apparatus 100 sends a SETUP message with a corresponding address (such as an IP address for a VOIP call or a phone number for a circuit switch call, or others) of a new peer communication entity $CN_i$ through $Cell_A$ to establish an active wireless communication with $CN_i$, where i represents an integer between 2 and (N−1). After the communication apparatus 100 receives a CONNECT message and transmits a CONNECT ACK message to the $CN_i$, the active wireless communication between the $CN_i$ and the communication apparatus 100 is established. The communication apparatus 100 then sends a FACILITY(BuildMPTY) message to request the network to connect the held peer communication entities with the active peer communication entity (i.e. connect peer communication entities in a conference communication). After the communication apparatus 100 receives a FACILITY ACK, the conference communication is established.

Figure 10:
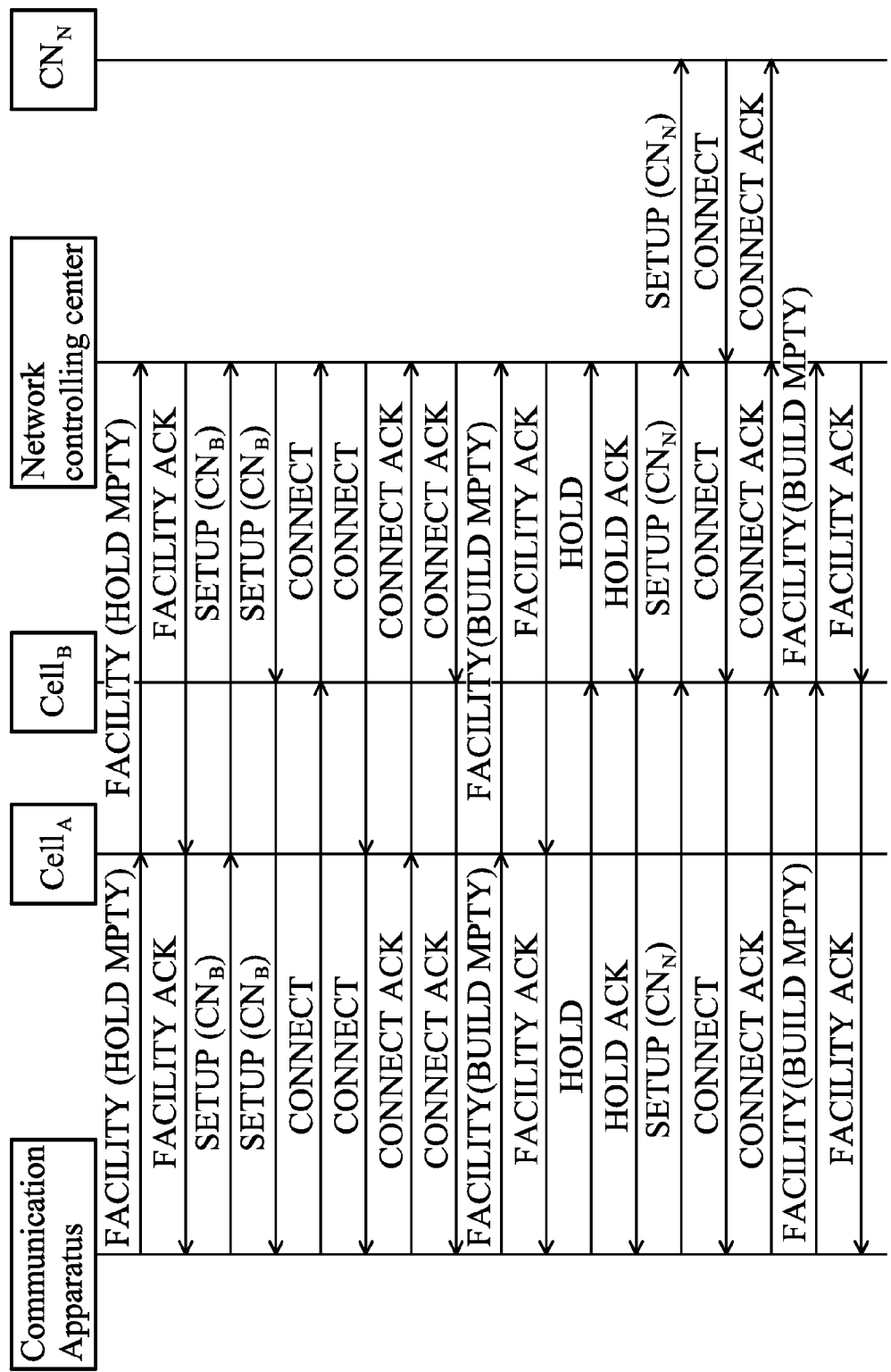
FIG. 10 shows a sequence diagram illustrating a simplified protocol message exchange for adding the $N^{th}$ new peer communication entity into the conference communication according to an embodiment of the invention when the total number K=(N−1)

FIG. 10 shows a sequence diagram illustrating an exemplary protocol message exchange for adding the $N^{th}$ new peer communication entity into the conference communication according to an embodiment of the invention when the total number K=(N−1). The communication apparatus 100 sends a FACILITY(Hold MPTY) message to the network controlling center, such as the MSC, to hold an active conference communication. After the network controlling center replies with a FACILITY ACK message, the active conference communication is held. Subsequently, $CN_A$ of the communication apparatus 100 sends a SETUP message with a corresponding address (such as an IP address for a VOIP call or a phone number for a circuit switch call, or others) of $CN_B$ of the communication apparatus 100 through $Cell_A$, the network controlling center, such as MSC, and $Cell_B$ in sequence to establish an active wireless communication between $CN_A$ and $CN_B$. It is to be noted that the communication apparatus 100 may also send the SETUP message with a corresponding address of $CN_A$ of the communication apparatus 100 through $Cell_B$ and the invention should not be limited thereto. $CN_B$ subsequently replies with a CONNECT message to $CN_A$ through $Cell_B$, the network controlling center and $Cell_A$ in sequence. After $CN_A$ transmits a CONNECT ACK message to $CN_B$, the active wireless communication between $CN_A$ and $CN_B$ is established. The communication apparatus 100 then sends a FACILITY(BuildMPTY) message to request the network to connect the held peer communication entities with $CN_B$ (i.e. connect peer communication entities in a conference communication). After the communication apparatus 100 receives a FACILITY ACK, the conference communication is established. Subsequently, the communication apparatus 100 sends a HOLD message to the network through $Cell_B$ to hold the conference communication between $CN_A$ and $CN_B$. After the network controlling center replies with a HOLD ACK message, the conference communication is held. The communication apparatus 100 sends a SETUP message with a corresponding address (such as an IP address for a VOIP call or a phone number for a circuit switch call, or others) of a new peer communication entity $CN_N$ through $Cell_B$ to establish an active wireless communication with $CN_N$. After the communication apparatus 100 receives a CONNECT message and transmits a CONNECT ACK message to the $CN_N$, the active wireless communication between $CN_N$ and the communication apparatus 100 is established. The communication apparatus 100 then sends a FACILITY (BuildMPTY) message to request the network to connect the held peer communication entities with the active peer communication entity (i.e. connect peer communication entities in a conference communication) through $Cell_B$. After the communication apparatus 100 receives a FACILITY ACK, the conference communication is established.

Figure 11:
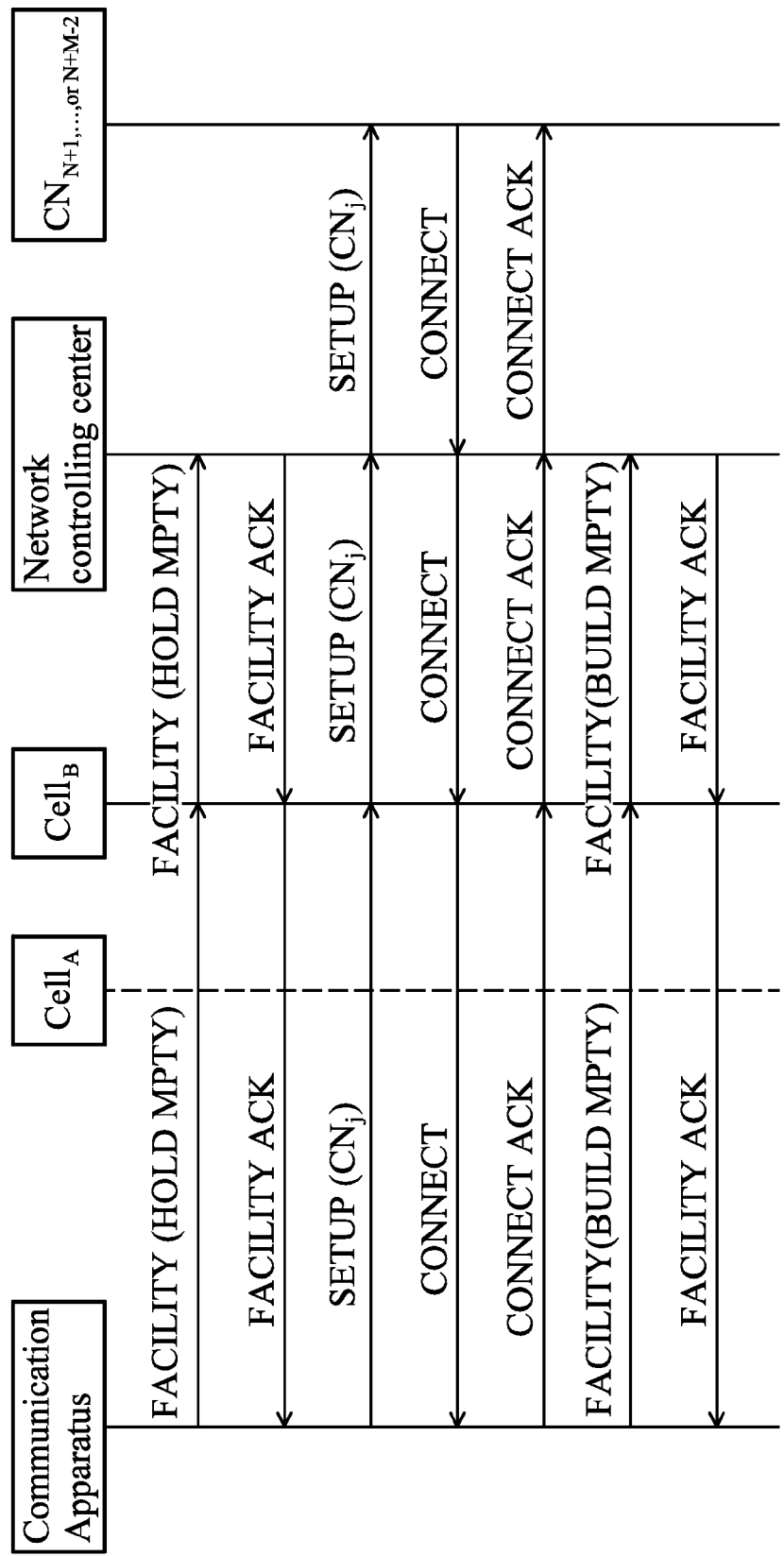
FIG. 11 shows a sequence diagram illustrating a simplified protocol message exchange for adding the $(N+1)^{th}$ to the $(N+M-2)^{th}$ new peer communication entity into the conference communication according to an embodiment of the invention when the total number N<=K<(N+M−2).

FIG. 11 shows a sequence diagram illustrating an exemplary protocol message exchange for adding the $(N+1)^{th}$ to the $(N+M-2)^{th}$ peer communication entities into the conference communication according to an embodiment of the invention when the total number $N<=K<(N+M-2)$. The communication apparatus 100 sends a FACILITY(Hold MPTY) message to the network controlling center to hold a conference communication via $Cell_B$. After the network controlling center replies with a FACILITY ACK message, the active conference communication is held. Subsequently, the communication apparatus 100 sends a SETUP message with a corresponding address of a new peer communication entity $CN_j$ through $Cell_B$ to establish an active wireless communication with $CN_j$, where j represents an integer between (N+1) and (N+M-2). After the communication apparatus 100 receives a CONNECT message and transmits a CONNECT ACK message to the $CN_j$, the active wireless communication between $CN_j$ and the communication apparatus 100 is established. The communication apparatus 100 then sends a FACILITY (BuildMPTY) message to request the network to connect the held peer communication entities with the active peer communication entity (i.e. connect peer communication entities in a conference communication). After the communication apparatus 100 receives a FACILITY ACK, the conference communication is established.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus accompanying with a first radio transceiver module, a second radio transceiver module, a first subscriber identity card camping on a first cell belonging to a first wireless network via the first radio transceiver module and a second subscriber identity card camping on a second cell belonging to a second wireless network via the second radio transceiver module, comprising:

processor logic coupled to the first radio transceiver module, the second radio transceiver module, the first subscriber identity card and the second subscriber identity card, building a conference communication for the first subscriber identity card with at most (N-1) peer communication entities via the first cell;

processor logic receiving an add request to add a new peer communication entity to the conference communication;

processor logic adding the second subscriber identity card to the conference communication via the first cell, and adding the new peer communication entity to the conference communication via the second cell, wherein the first wireless network is capable of providing a conference communication service for the first subscriber identity card with at most N peer communication entities; and processor logic configured to fetch data and subscriber identity module (SIM) application toolkit commands, wherein the communication apparatus is programmed in response to the first or second subscriber identity card being plugged in making the information stored on the first or second subscriber identity card accessible to the processor logic.

2. The communication apparatus as claimed in claim 1, further comprising processor logic that holds the conference communication with the (N-1) peer communication entities or less, establishes a first wireless communication between the first subscriber identity card and the second subscriber identity card, connects the second subscriber identity card with the held peer communication entities in the conference communication, holds the first wireless communication, establishes a second wireless communication between the second subscriber identity card and the new peer communication entity, and connects the new peer communication entity with the second subscriber identity card in the conference communication.

3. The communication apparatus as claimed in claim 2, wherein the processor logic holds the conference communication with the peer communication entities by transmitting a hold request from the first subscriber identity card to the first cell.

4. The communication apparatus as claimed in claim 2, wherein the processor logic establishes the first wireless communication between the first subscriber identity card and the second subscriber identity card by transmitting a wireless communication request from the first subscriber identity card to the first cell to request.

5. The communication apparatus as claimed in claim 2, wherein the processor logic connects the second subscriber identity card with the held peer communication entities in the conference communication by transmitting a build conference communication request from the first subscriber identity card to the first cell.

6. The communication apparatus as claimed in claim 2, wherein the processor logic holds the first wireless communication by transmitting a hold request from the second subscriber identity card to the second cell.

7. The communication apparatus as claimed in claim 2, wherein the processor logic establishes the second wireless communication between the second subscriber identity card and the new peer communication entity by transmitting a second wireless communication request from the second subscriber identity card to the second cell.

8. The communication apparatus as claimed in claim 2, wherein the processor logic connects the new peer communication entity with the second subscriber identity card in the conference communication by transmitting a second build conference communication request from the second subscriber identity card to the second cell.

9. The communication apparatus as claimed in claim 1, further comprising processor logic that transmits a first hold request from the first subscriber identity card to the first cell to request to hold the conference communication with the peer communication entities, transmits a first wireless communication request from the second subscriber identity card to the second cell to request to establish a first wireless communication with the first subscriber identity card, establishes the first wireless communication between the first subscriber identity card and the second subscriber identity card, transmits a second hold request from the second subscriber identity card to the second cell to request to hold the first wireless communication with the first subscriber identity card, transmits a second wireless communication request from the second subscriber identity card to the second cell to request to establish a second wireless communication with the new peer communication entity, establishes the second wireless communication between the second subscriber identity card and the new peer communication entity, builds the conference communication by transmitting a first build conference communication request from the second subscriber identity card to the second cell to combine the new peer communication entity with the held first subscriber identity card in the conference communication, and builds the conference communication by transmitting a second build conference communication request from the first subscriber identity card to the first cell to combine the second subscriber identity card with the held peer communication entities in the conference communication.

10. The communication apparatus as claimed in claim 1, further comprising processor logic that transmits a first wireless communication request from the second subscriber identity card to the second cell to request to establish a first wireless communication with the new peer communication entity, establishes the first wireless communication between the second subscriber identity card and the new peer communication entity, transmits a first hold request from the second subscriber identity card to the second cell to request to hold the first wireless communication with the new peer communication entity, transmits a second hold request from the first subscriber identity card to the first cell to request to hold the conference communication with the peer communication entities, transmits a second wireless communication request from the first subscriber identity card to the first cell to establish a second wireless communication with the second subscriber identity card, establishes the second wireless communication between the first subscriber identity card and the second subscriber identity card, builds the conference communication by transmitting a first build conference communication request from the first subscriber identity card to the first cell to combine the second subscriber identity card with the held peer communication entities in the conference communication, and builds the conference communication by transmitting a second build conference communication request from the second subscriber identity card to the second cell to combine the first subscriber identity card with the held new peer communication entity in the conference communication.

11. The communication apparatus as claimed in claim 1, further comprising processor logic that transmits a first wireless communication request from the second subscriber identity card to the second cell to request to establish a first wireless communication with the new peer communication entity, establishes the first wireless communication between the second subscriber identity card and the new peer communication entity, transmits a first hold request from the second subscriber identity card to the second cell to request to hold the first wireless communication with the new peer communication entity, transmits a second hold request from the first subscriber identity card to the first cell to request to hold the conference communication with the peer communication entities, transmits a second wireless communication request from the second subscriber identity card to the second cell to request to establish a second wireless communication with the first subscriber identity card, establishes the second wireless communication between the first subscriber identity card and the second subscriber identity card, builds the conference communication by transmitting a first build conference communication request from the second subscriber identity card to the second cell to combine the first subscriber identity card with the held new peer communication entity in the conference communication, and builds the conference communication by transmitting a second build conference communication request from the first subscriber identity card to the first cell to combine the second subscriber identity card with the held peer communication entities in the conference communication.

12. The communication apparatus as claimed in claim 1, wherein the second wireless network is capable of providing a conference communication service for the second subscriber identity card with at most M peer communication entities, and the communication apparatus further comprises processor logic accompanying with a display device that displays items representing the peer communication entities to facilitate a user to connect at most (M+N−2) peer communication entities in the conference communication.

13. The communication apparatus as claimed in claim 12, further comprising processor logic that displays a rejection indication on the display device when over (M+N−2) peer communication entities are selected to be connected in the conference communication.

14. The communication apparatus as claimed in claim 1, wherein at least one of the first subscriber identity card and the second subscriber identity card is the subscriber identity module (SIM) card corresponding to the global system for mobile communications (GSM) communication system, the universal subscriber identity module (USIM) card corresponding to the universal mobile telecommunications system (UMTS) or time division-synchronous code division multiple access (TD-SCDMA) communication system, or the removable user identity module (RUIM) card or the CDMA subscriber identity module (CSIM) card corresponding to the code division multiple access (CDMA) 2000 communication system.

15. A method for handling conference communication service in the communication apparatus, the communication apparatus comprising a first subscriber identity card camping on a first cell belonging to a first wireless network, and a second subscriber identity card camping on a second cell belonging to a second wireless network, and the first wireless network being capable of providing a conference communication service for the first subscriber identity card with at most N peer communication entities, the method comprising:
building a conference communication for the first subscriber identity card with at most (N−1) peer communication entities via the first cell;
receiving an add request to add a new peer communication entity to the conference communication;
adding the second subscriber identity card to the conference communication via the first cell;
adding the new peer communication entity to the conference communication via the second cell;

fetching data and subscriber identity module (SIM) application toolkit commands, and using the fetched data and subscriber identity module (SIM) application toolkit commands to program the communication apparatus in response to the first or second subscriber identity card being plugged in, making the information stored on the first or second subscriber identity card accessible to the processor logic.

16. The method as claimed in claim 15, further comprising:
holding the conference communication with the peer communication entities;
establishing a first wireless communication between the first subscriber identity card and the second subscriber identity card;
connecting the second subscriber identity card with the held peer communication entities in the conference communication;
holding the first wireless communication;
establishing a second wireless communication between the second subscriber identity card and the new peer communication entity; and
connecting the new peer communication entity with the held first communication entity in the conference communication.

17. The method as claimed in claim 16, wherein the conference communication with the peer communication entities is held by transmitting a hold request from the first subscriber identity card to the first cell.

18. The method as claimed in claim 16, wherein the first wireless communication between the first subscriber identity card and the second subscriber identity card is established by transmitting a wireless communication request from the first subscriber identity card to the first cell to request.

19. The method as claimed in claim 16, wherein the second subscriber identity card is connected with the held peer communication entities in the conference communication by transmitting a build conference communication request from the first subscriber identity card to the first cell.

20. The method as claimed in claim 16, wherein the first wireless communication is held by transmitting a hold request from the second subscriber identity card to the second cell.

21. The method as claimed in claim 16, wherein the second wireless communication between the second subscriber identity card and the new peer communication entity is established by transmitting a second wireless communication request from the second subscriber identity card to the second cell.

22. The method as claimed in claim 16, wherein the new peer communication entity is connected with the second subscriber identity card in the conference communication by transmitting a second build conference communication request from the second subscriber identity card to the second cell.

* * * * *